United States Patent Office 2,770,360
Patented Nov. 13, 1956

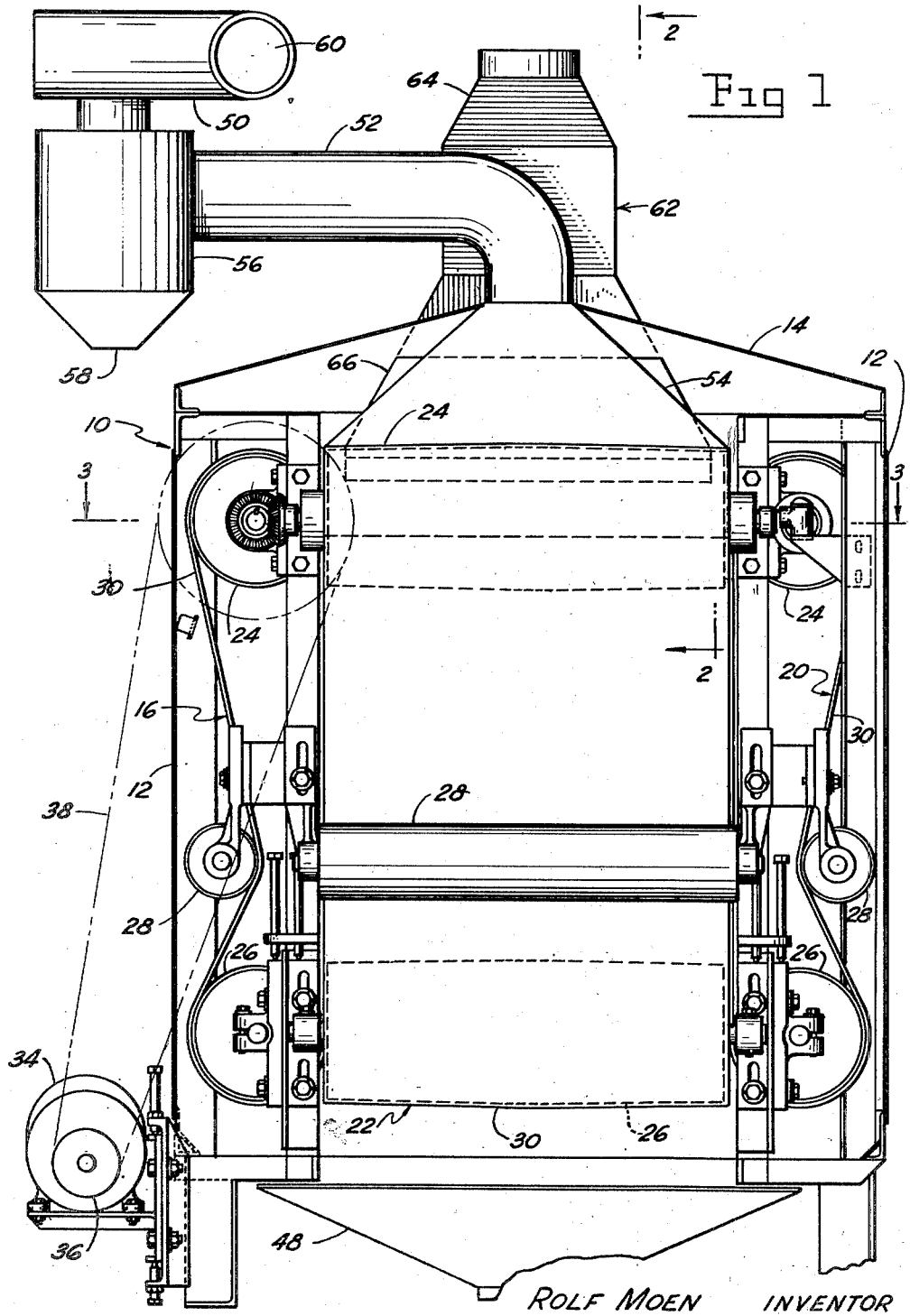

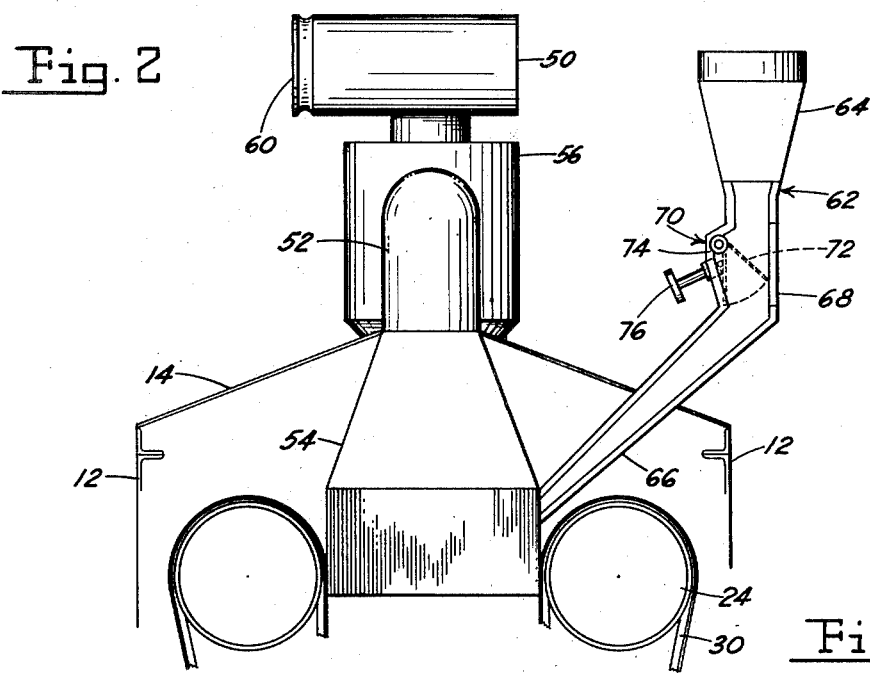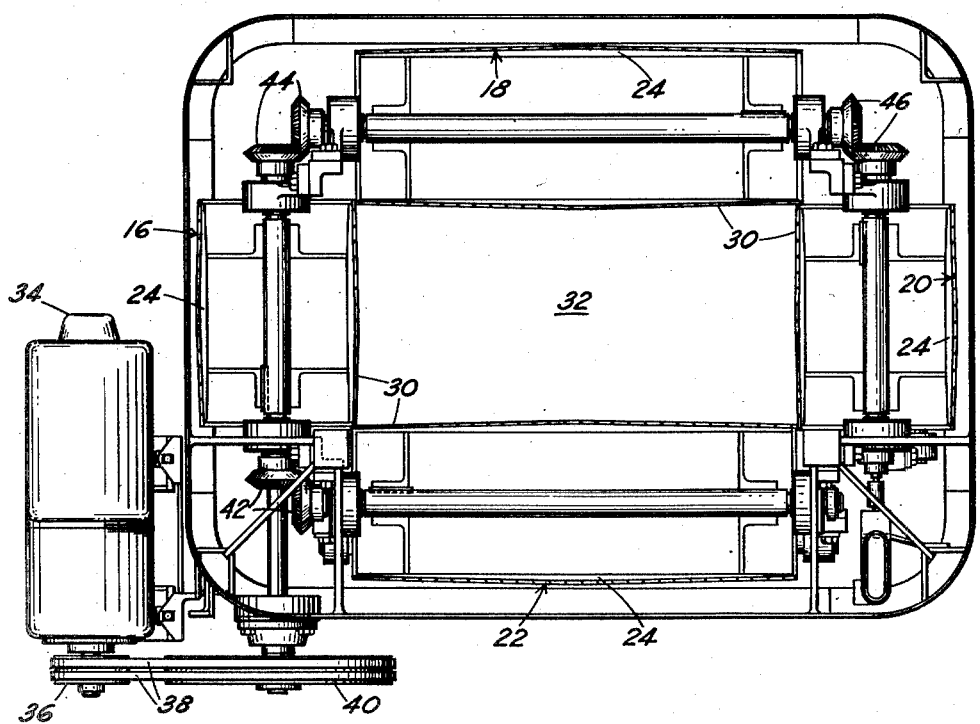

2,770,360

SEPARATOR

Rolf Moen, Minneapolis, Minn., assignor to General Mills, Inc., a corporation of Delaware Application June 8, 1953, Serial No. 360,127

9 Claims. (Cl. 209—139)

This invention relates in general to separators or classifiers for segregating granular material having different densities and/or sizes.

In the past, separation or classification of particles on a weight and size basis has become quite wide-spread, consisting in subjecting the composite material or aggregate to a process employing a stream of upwardly moving fluid, such as air, those particles having what is termed a higher terminal velocity falling downwardly through the fluid and those having a lower terminal velocity being lifted or carried upwardly with the fluid. The difficulty attending such a separation procedure is that it does not possess the selectiveness or fineness of separation desired in many operations, stemming from the fact that a frictional drag is created adjacent the sidewalls of the passageway in which the separation is taking place. The frictional drag, of course, is instrumental in causing pressure and velocity variations which seriously and adversely affect the uniformity of the air stream with a concomitant result that close segregation will not result.

Accordingly, one important object of the invention is to provide a separator which will be highly selective in its action, thereby permitting a reliable separation of particles even though such particles are closely analogous from a weight and/or size standpoint. Although the invention is in no way limited to grain milling operation, it will find especial utility in the following grain classifying procedures:

1. The primary separation of whole or dirty wheat before cleaning, the liftings containing the impurities and certain light-weight kernels being elevated with the air stream with the heavier kernels falling downwardly into a suitable receptacle.
2. Broken wheat recovery, in which the broken weed seeds are removed from the broken wheat, and
3. The separation of germ from bran.

More specifically, it is an aim of the invention to eliminate for all intents and purposes the frictional drag along the sides of the separating passage to produce a relatively uniform fluid velocity over the cross sectional area of the passage so that the high degree of selectivity mentioned above will be achieved.

Another object of the invention is to render the apparatus sufficiently flexible or adjustable so that it will be usable for a wide range of granular sizes and densities even though any given material to be separated includes particles having fairly similar terminal velocities.

Another object is to provide separating apparatus of the aspirating variety in which the feed of the granular material is automatically controlled at an optimum rate without reduction in the amount of effective air flow through the separating passage, either during the feeding of such material or when the supply has become exhausted.

Further, it is an object of the invention to provide separating apparatus of the foregoing character that will be of comparatively low initial cost, easy to operate and maintain, efficient, and long lasting.

With the foregoing and other objects in view, which will be manifest in the following detailed description and specifically pointed out in the appended claims, reference should be had to the accompanying drawings forming an illustrative embodiment of the invention wherein:

Figure 1 is an elevational view of the separator with the forward portion of the housing removed to show clearly the internal construction thereof;

Fig. 2 is a fragmentary sectional view taken in the direction of line 2—2 of Fig. 1, and Fig. 3 is a sectional view taken in the direction of line 3—3 of Fig. 1.

Referring now in detail to the drawings, the separator forming the subject matter of the instant invention has been designated generally by the reference numeral 10, and in the exemplary embodiment is of the aspirating variety. Encasing the movable parts hereinafter described are sidewalls 12 and a cover 14.

Rotatably mounted on a suitable framework within the confines of the sidewalls 12 and the hood 14 are four belt assemblies 16, 18, 20 and 22, each including an upper roller 24, a lower roller 26, an idler roller 28, and an endless belt 30 entrained about the several rollers. As best seen from an inspection of Fig. 3, the inner or opposed sections of the belts 30 cooperate to form a passageway 32 in which the actual separation or segregation takes place, the belts being arranged in an over-extending or over-lapping, contiguous relation to avoid loss of material during classification thereof.

Each of the belt assemblies is driven in a direction so that the inner sections of the belts 24, that is, those sections forming the passageway 32 will be moved upwardly at a desired rate of speed corresponding substantially to the rate of air flow produced in a manner presently to be explained. For the purpose of driving the belt assembly, there is provided a motor 34 equipped with sheaves or pulleys 36 about which pass a pair of driving belts 38 which also pass over additional pulleys 40 connected to the shaft of one of the rollers 24. By reason of several sets of bevel gears 42, 44 and 46 all of the belt assemblies 16, 18, 20 and 22 are caused to move in unison, and therefore each belt 30 will be synchronized with the others to provide, by adjustment of the motor 34, a belt speed corresponding to that of the air stream within the passageway 32.

Disposed beneath the lower end of the passageway 32 is a receptacle 48 for the purpose of collecting the heavier particles which have passed downwardly through the upwardly directed current of air, there being sufficient space between the lower ends of the belt assemblies 16, 18, 20 and 22, so that air may be drawn into the passageway 32 without interference. In the present instance, the air is illustratively induced to flow upwardly through the passageway 32 by means of a fan 50, the air passing to this exhaust fan via a duct 52 having a hood or flared end 54 telescopically received within the upper end of the passageway 32. In circuit with the duct 52 is a cyclone separator 56 of conventional construction which serves as the agency for freeing the light-weight particles from the induced air current carrying them. The freed light-weight particles are discharged downwardly through an outlet 58 in the cyclone separator for appropriate collection, whereas the unburdened air is discharged to atmosphere via an outlet 60 in the casing of the fan 50.

In order to introduce the granular material to be classified into the air stream, a feeder which will provide a uniform flow rate and air seal to prevent air from being drawn into the separating passage is extremely desirable. An exemplary feeder 62 is shown surmounted above the upper end of the passageway 32, the feeder mechanism comprising a hopper 64, a discharge spout or chute 66 extending into the hood 54 of the duct 52 and an intermediate duct section 68. Inasmuch as the granular material, for effective separation, must be fed in proper quantities to the passageway 32, a control valve 70 is installed in the duct 68, the control valve including a swingable gate or pivotal flap 72, a lever arm 74, and an elongated weight member 76 threadedly connected to the arm 74 whereby the flap may be biased or counterbalanced so that only the proper amount of material will pass. Owing to the presence of the valve 70, there will be no unnecessary intake of air through the hopper 64 and all incoming air will be forced to enter the lower end of the passageway 32, thus maintaining the system in a stabilized condition for the type of material the fan 50 has been adjusted for.

From the preceding description the operation of the separator is believed quite apparent. However, in order to fully understand the manner in which the apparatus functions, it is perhaps desirable to give a typical example. Therefore, assuming that it is desired to effect a primary separation of dirty wheat, it will be understood that the exhaust fan 50 is first adjusted so that the requisite air velocity through the passageway 32 will be obtained. In actual practice, it has been found that an air velocity of 23 feet per second is a satisfactory velocity for the exemplified separating operation. Having adjusted the fan speed for the proper amount, then it is necessary to adjust the speed of the motor 34 so that the belts 30 will be driven at a speed approximating that of the air stream. I have found that it is not necessary from a practical standpoint to have exact correspondence between the belt speed and the air speed and it has been discovered that the belt speed may be varied from 10% above the air speed down to 5% less than the air speed without substantial loss of benefits. Once the belt speed has been adjusted so that it corresponds substantially with the air speed, then the hopper 64 may be filled in any suitable manner, such as by means of a pneumatic conveyor, with the granular material to be separated. The control valve 70, of course, must be adjusted by means of the adjustable weight 76 so that the swingable gate 72 will release the proper amount of material to give the optimum separation or classification. With the control valve 70 properly adjusted, it will be apparent that the air stream will not be overloaded with the composite material, which overloading, if allowed to occur, would adversely influence the selectiveness of separation. Once the hopper 64 has been filled, as by direct connection to a continuous source of supply, the operation of the separator will be automatic from then on.

In the course of operation under the exemplified conditions, the heavier or larger kernels possessing a terminal velocity sufficient to permit them to fall gravitationally downwardly through the upwardly moving air stream will be collected in receptacle 48. On the other hand the lighter weight kernels and impurities will be carried in the air stream upwardly through the duct 52 to the cyclone separator 56 where the liftings will be removed from the air stream and discharged downwardly through the opening 58, the unburdened air merely passing upwardly and outwardly through the exhaust fan 50.

In this specific instance as much as 25% of the composite material will be removed and fed to the cyclone separator 56. The liftings obtained through the discharge opening 58 of the cyclone separator can then be suitably cleaned by conventional wheat cleaning equipment. It should be pointed out that by concentrating the impurities into a relatively small fraction of wheat, a considerable saving in equipment can be effected, since the great bulk of the material will be collected in the receptacle 48 and will not require the further cleaning procedure to which the material received from the cyclone separator 56 will have to be subjected.

To avoid any possibility of confusion it should be mentioned that the term "terminal velocity" which has been used at various times in the preceding description may be defined as the maximum velocity that a particle dropped into static air will attain. Thus the terminal velocity rating of any particular material will be indicative of the combined effect of size, weight and shape of that particular material.

It will be understood that my invention is not limited to the specific illustrative embodiment thereof described in the accompanying drawings but includes such modifications thereof as fall within the scope of the appended claims.

I claim as my invention:

1. In a separating apparatus, the combination of movable wall means arranged to constitute the sides of a vertical passageway having a substantially continuous inner wall surface, means guiding said wall means in a direction so as to maintain said passageway open at all times, means for causing fluid to flow upwardly through said passageway at a selected rate, and means for moving said wall means in the direction of fluid flow at a rate corresponding substantially to said selected flow rate.

2. In a separating apparatus, the combination of endless flexible means arranged to constitute the sides of a vertical passageway having a substantially continuous inner wall surface, means guiding said wall surface in a direction so as to maintain said passageway open at all times, means for causing fluid to flow upwardly through said passageway at a selected rate, and means for moving said flexible means in the direction of fluid flow at a rate coeresponding substantially to said selected flow rate.

3. In a separating apparatus, the combination of a plurality of belts arranged to constitute the sides of a vertical passageway, means guiding said belts in a direction so as to maintain said passageway open at all times, means for causing fluid to flow upwardly through said passageway at a selected rate, and means for driving each of said belts in the direction of fluid flow at a rate corresponding substantially to said selected flow rate.

4. In a separating apparatus, the combination of a plurality of belts arranged to constitute the sides of a vertical passageway, means guiding said belts in a direction so as to maintain said passageway open at all times, means for causing fluid to flow upwardly through said passageway at a selected rate, and means for driving each of said belts in unison in the direction of fluid flow at a synchronized rate corresponding substantially to said selected flow rate.

5. In a separating apparatus, the combination of a plurality of belts arranged to constitute the sides of a vertical passageway, means guiding said belts in a direction so as to maintain said passageway open at all times, means for causing fluid to flow upwardly through said passageway at a selected rate, and means for driving each of said belts in the direction of fluid flow at a rate not over 10% above and not less than 5% below said selected flow rate.

6. In a separating apparatus, the combination of a plurality of belts angularly arranged with portions of adjacent belts contiguous to each other to constitute the sides of a vertical passageway having a substantially continuous inner wall surface, means guiding said belts in a direction so as to maintain said passageway open at all times, means for causing fluid to flow upwardly through said passageway at a selected rate, and means for driving said belts in unison in the direction of fluid flow at a synchronized rate corresponding substantially to said selected flow rate.

7. In a separating apparatus, the combination of a plurality of belts angularly arranged with their adjacent marginal edges overlapping each other to constitute the sides of a vertical passageway having a substantially continuous inner wall surface, means guiding said belts in a direction so as to maintain said passageway open at all times, means for causing fluid to flow upwardly through said passageway at a selected rate, and means for driving each of said belts in unison in the direction of fluid flow at a synchronized rate corresponding substantially to said selected flow rate.

8. In a separating apparatus, the combination of four elongated belts arranged in two parallel pairs to constitute the four sides of a vertical longitudinal passageway, means for causing fluid to flow upwardly through said passageway at a selected rate, and means for driving each of said belts in the direction of fluid flow at a rate corresponding substantially to said selected flow rate.

9. In a separating apparatus, the combination of a plurality of elongated belts arranged in two parallel pairs with their adjacent marginal edges over extending each other to constitute the sides of a vertical passageway having a substantially continuous inner inner wall surface, means for causing fluid to flow upwardly through said passageway at a selected rate, and means for driving said belts in unison in the direction of fluid flow at a synchronized rate not over 10% above and not less than 5% below said selected flow rate.

References Cited in the file of this patent

UNITED STATES PATENTS

| | | |
|---|---|---|
| 827,213 | Comstock | July 31, 1906 |
| 1,575,165 | Hopkinson | Mar. 2, 1926 |
| 2,254,116 | Cooper et al. | Aug. 26, 1941 |